US007886637B2

(12) United States Patent
Campbell et al.

(10) Patent No.: US 7,886,637 B2
(45) Date of Patent: Feb. 15, 2011

(54) MULTIPLE PIN RETENTION FOR UNIVERSAL SOCKET

(75) Inventors: David C. Campbell, Bel Air, MD (US); Marco Alessandro Mattucci, Baltimore, MD (US); Robert H. Gifford, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 198 days.

(21) Appl. No.: 12/363,355

(22) Filed: Jan. 30, 2009

(65) Prior Publication Data

US 2010/0192732 A1 Aug. 5, 2010

(51) Int. Cl.
*B25B 13/58* (2006.01)
*B23P 19/04* (2006.01)

(52) U.S. Cl. ....................... 81/185; 81/DIG. 11; 29/700

(58) Field of Classification Search ................ 81/124.5, 81/185, DIG. 11, 442, 448, 179; 29/700; 269/224, 266
See application file for complete search history.

(56) References Cited

U.S. PATENT DOCUMENTS

| | | | |
|---|---|---|---|
| 1,529,605 | A | 3/1925 | Muncey |
| 1,690,018 | A | 10/1928 | Kerfoot |
| 1,896,949 | A | 2/1933 | Greiner |
| 1,997,948 | A | 4/1935 | Pearson |
| 2,711,112 | A | 6/1955 | Durand |
| 2,754,708 | A | 7/1956 | Peterson |
| 3,250,158 | A | 5/1966 | Mahall |
| 3,262,338 | A | 7/1966 | Mahall |
| 3,349,655 | A | 10/1967 | Locke |
| 3,674,070 | A | 7/1972 | Mahoney |
| 3,698,267 | A | 10/1972 | Denney |
| 3,858,468 | A | 1/1975 | Pasbrig |
| 4,887,498 | A | 12/1989 | Zayat |
| 4,993,289 | A | 2/1991 | Parks |
| 5,157,995 | A | 10/1992 | Nogues |
| 5,193,420 | A | 3/1993 | Smith |
| 5,460,064 | A | 10/1995 | Zayat, Jr. |
| D368,213 | S | 3/1996 | Marks et al. |
| 5,551,320 | A | 9/1996 | Horobec et al. |
| 5,622,090 | A | 4/1997 | Marks |
| 5,644,959 | A | 7/1997 | Howard |

(Continued)

*Primary Examiner*—David B Thomas
(74) *Attorney, Agent, or Firm*—Harness, Dickey & Pierce, P.L.C.

(57) ABSTRACT

A universal socket that forms around a fastener to drive the fastener received by the universal socket generally includes a socket housing including a circumferential wall that defines a chamber having an inner periphery and an opening. The inner periphery extends through the socket housing along a longitudinal axis. A plurality of pin members is operable to be disposed in the chamber. A plate member has a first surface and a second surface that define through holes formed between the first and second surfaces. The through holes accommodate a cross-sectional diameter of a middle portion of the pin members but each of the through holes is too small to accommodate a cross-sectional diameter of a first end portion of the pin members. The plate member is operable to connect in the chamber to hold the plurality of pin members in the socket housing. A plurality of pin cap members includes frangible connections with an adjacent pin cap member. The plate member has a frangible connection with at least a part of the plurality of pin cap members. A first end portion of each of the pin cap members defines an aperture that is operable to accept the second end portion of the pin members.

16 Claims, 16 Drawing Sheets

U.S. PATENT DOCUMENTS

| | | | |
|---|---|---|---|
| 5,676,028 | A | 10/1997 | Jordan |
| D385,762 | S | 11/1997 | Marks |
| 5,746,416 | A | 5/1998 | Paylor |
| 5,791,209 | A | 8/1998 | Marks |
| 5,794,644 | A | 8/1998 | Paylor |
| 5,806,385 | A | 9/1998 | Schupp |
| 5,829,328 | A | 11/1998 | Chen |
| 5,937,715 | A | 8/1999 | Lin |
| 6,023,999 | A | 2/2000 | Cho |
| 6,085,619 | A | 7/2000 | Blake et al. |
| 6,089,130 | A | 7/2000 | Wu |
| 6,092,443 | A | 7/2000 | Zayat, Jr. |
| 6,098,507 | A | 8/2000 | Lin |
| 6,138,534 | A | 10/2000 | Cho |
| 6,182,538 | B1 | 2/2001 | Chen |
| D439,481 | S | 3/2001 | Lin |
| 6,272,953 | B1 | 8/2001 | Kant |
| 6,374,710 | B2 | 4/2002 | Kuo |
| 6,467,379 | B1 | 10/2002 | Wizman |
| 6,474,198 | B2 | 11/2002 | Lowther |
| 6,792,835 | B1 | 9/2004 | Quick et al. |
| 6,928,906 | B1 | 8/2005 | Marks |
| 7,036,402 | B1 | 5/2006 | Marks et al. |
| 7,290,469 | B2 | 11/2007 | Walters et al. |
| 2006/0042427 | A1 | 3/2006 | Walters et al. |

MULTIPLE PIN RETENTION FOR UNIVERSAL SOCKET

FIELD

The present disclosure relates to a universal socket having a plurality of retractable pins and more particularly relates to a pin plate that slidably supports multiple retractable pin members so the universal socket can form around various size fasteners.

BACKGROUND

With reference to FIG. 1, a universal socket 10 is shown and is further described in U.S. Pat. No. 5,937,715. The universal socket 10 includes a housing 12 that defines a fastener receiving hole 14. The fastener receiving hole 14 can have an opening 16 with a substantially hexagonal cross-section that receives a fastener 18. A plate 20 has a hexagonal cross-section and includes projections 22 for engaging with depressions 24 and curved slots 26 formed in the housing 12. The projections 22 on the plate 20 cooperate with the depressions 24 and the curve slots 26 on the housing 12 to allow the plate 20 to be secured in a middle portion of the fastener receiving hole 14 of the housing 12.

The plate 20 includes a number of apertures 30 that each slidably supports a rod 32. Each of the rods 32 include a head 34 formed on one end for engaging with the plate 20 and an outer thread 36 formed on the other end. Each of said rods 32 connect to a hexagonal post 40 that each include six flat surfaces 42 formed on an outer periphery of the hexagonal post 40. Each of the hexagonal post 40 includes an inner thread 44 formed in one end to couple with the outer thread 36 of the rod 32. In this regard, the hexagonal post 40 is secured to and moves in concert with the rods 32. Springs 50 are engaged on the rods 32 and compressed between the plate 24 and each of the hexagonal post, 40. The springs 50 urge the hexagonal post 40 away from the plate 20 and toward the opening 16 of the fastener receiving hole 14. The heads 34 of the rods 32 contain the spring members 50 between the plate 20 and the heads 34 to keep the rods 32 connected to the plate 20. As the spring members 50 push the hexagonal post 40 towards the opening 16. In this arrangement, each of the rods 32 must be individually threaded into each of the hexagonal posts 40, which can require each of the hexagonal post 40 be held while a tool rotates each of the rods 32 with the springs 50 into each of the hexagonal post 40 to build the assembly.

SUMMARY

The present teachings generally include a universal socket that forms around a fastener to drive the fastener received by the universal socket. The universal socket generally includes a socket housing having a circumferential wall that defines a chamber having an inner periphery and an opening. The inner periphery extends through the socket housing along a longitudinal axis. A plurality of pin members is operable to be disposed in the chamber. Each of the pin members has a middle portion disposed between a first end portion and a second end portion. The first end portion is operable to contact the fastener. The middle portion has a cross-sectional diameter that is greater than a cross-sectional diameter of the second end portion and less than a cross-sectional diameter of the first end portion. A plate member has a first surface and a second surface defining through holes formed between the first and second surfaces. The through holes accommodate the cross-sectional diameter of the middle portion of the pin members but each of the through holes is too small to accommodate the cross-sectional diameter of the first end portion of the pin members. The plate member is operable to connect in the chamber to hold the plurality of pin members in the socket housing. A plurality of pin cap members each having a frangible connection with an adjacent pin cap member. The plate member has a frangible connection with at least a part of the plurality of pin cap members. Each of the pin cap members having a first end portion and a second end portion. The first end portion of each of the pin cap members defines an aperture that is operable to accept the second end portion of the pin members.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present teachings in any way.

Figure 14:
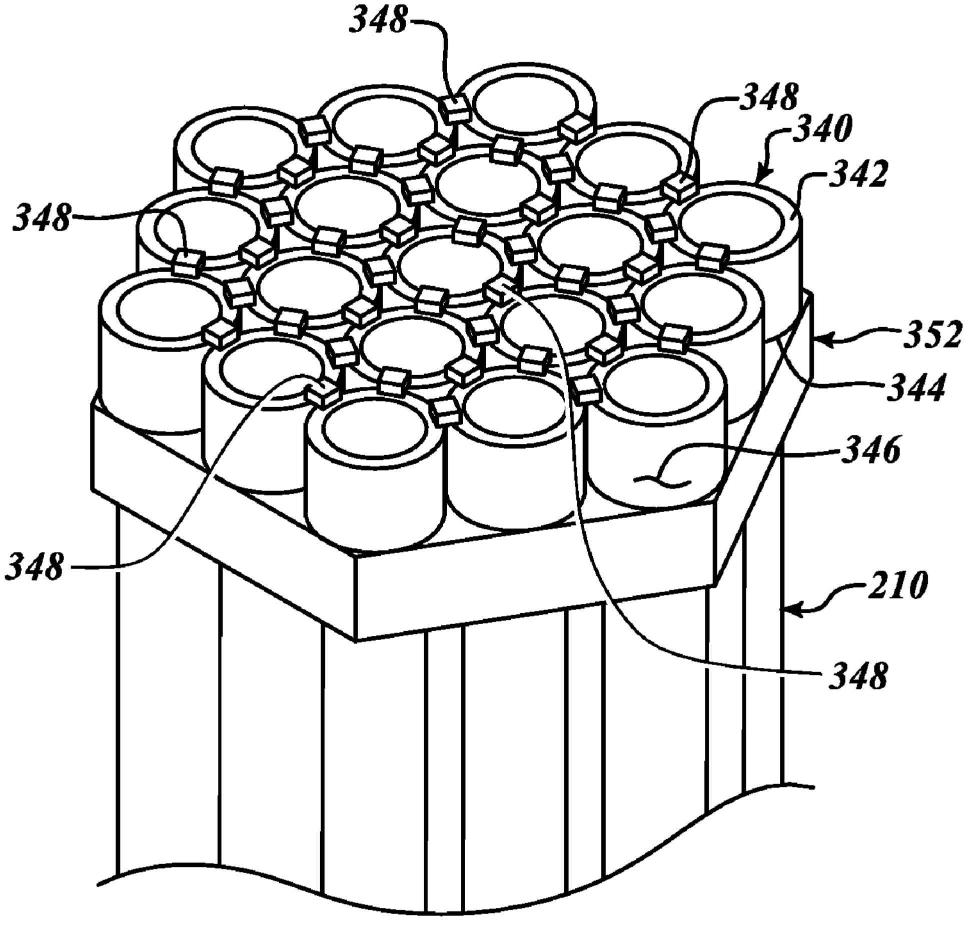
Figure 15:
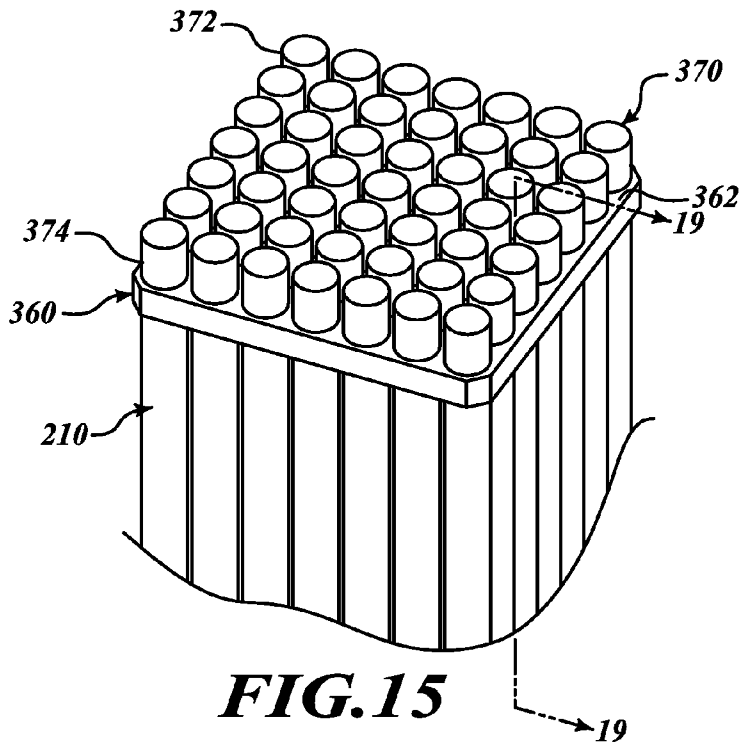

FIG. 14 is a partial perspective view of pin cap members showing frangible connections between each of the pin cap members in accordance with a further example of the present teachings FIG. 15 is a partial perspective view of a plate member that is integrally molded with a plurality of pin cap members to provide frangible connections between each of the pin cap members and the plate member in accordance with a further example of the present teachings.

Figure 16:
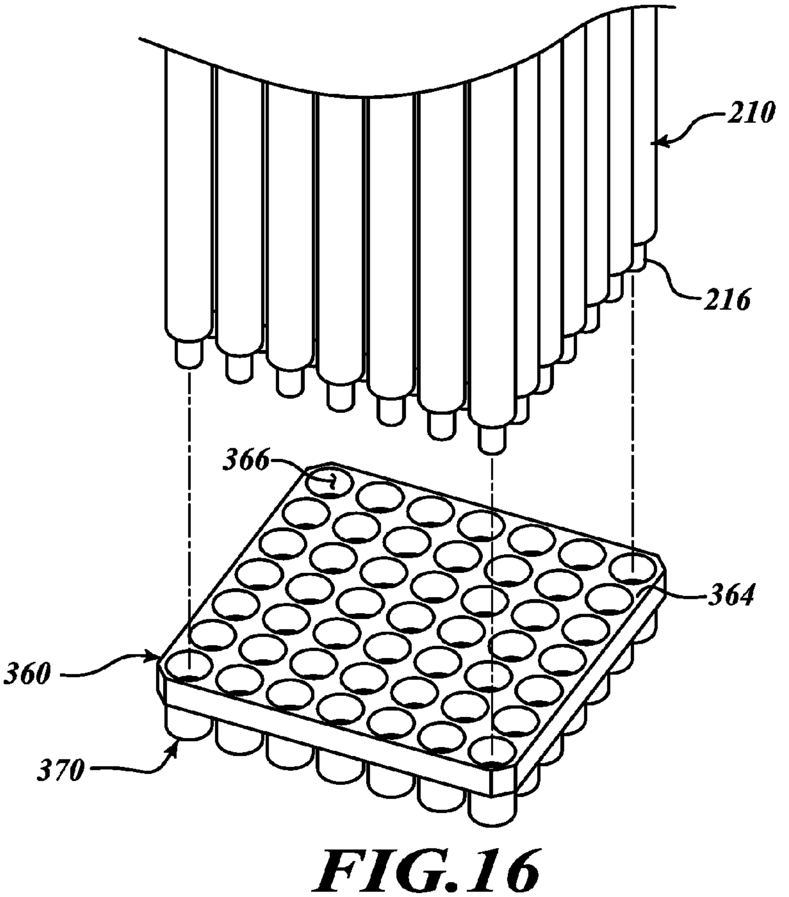

FIG. 16 is a partial perspective view of the plate member and the plurality of pin cap members of FIG. 15 aligned to receive a plurality of pin members.

Figure 17:
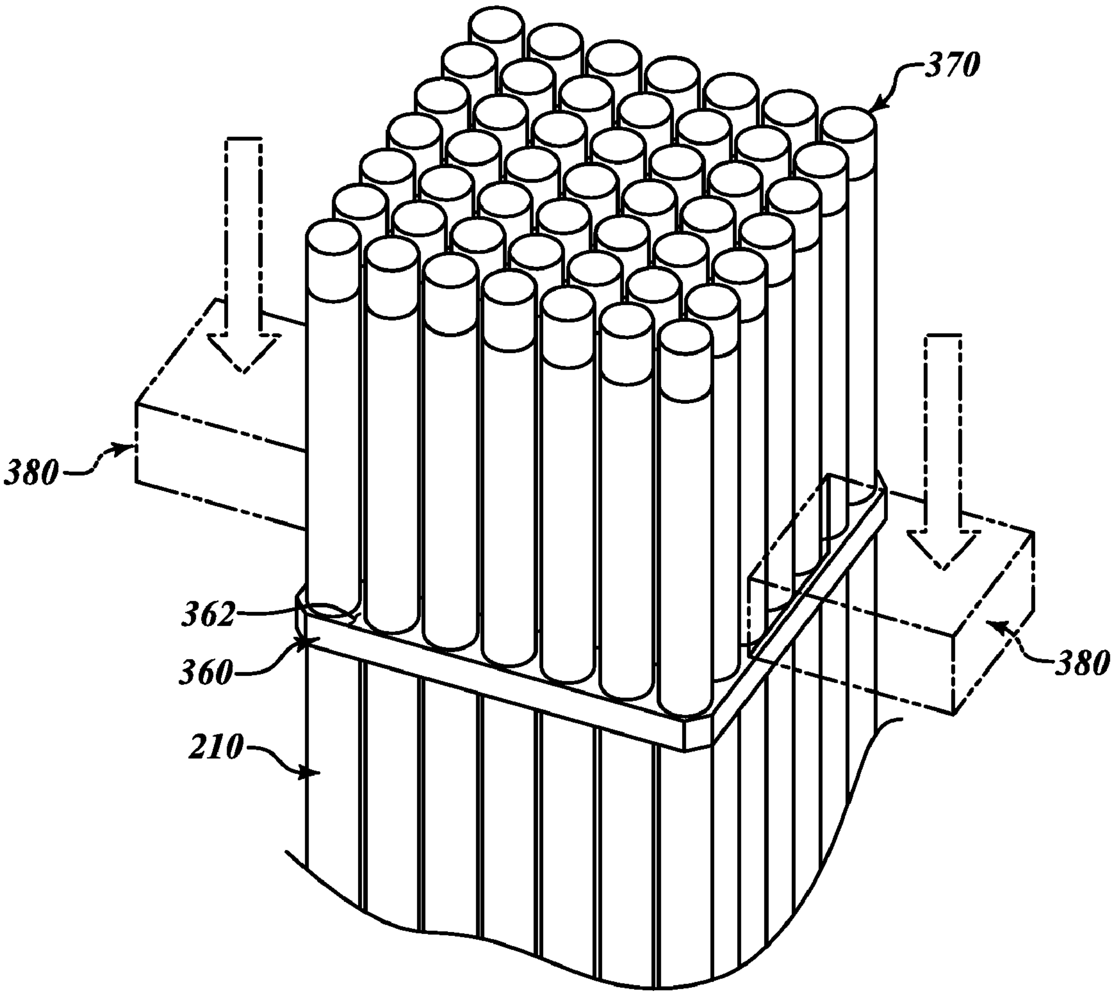

FIG. 17 is a partial perspective view of the frangible connection being severed that was between the plate member and the pin cap members of FIG. 16 in accordance with the present teachings.

Figure 18:
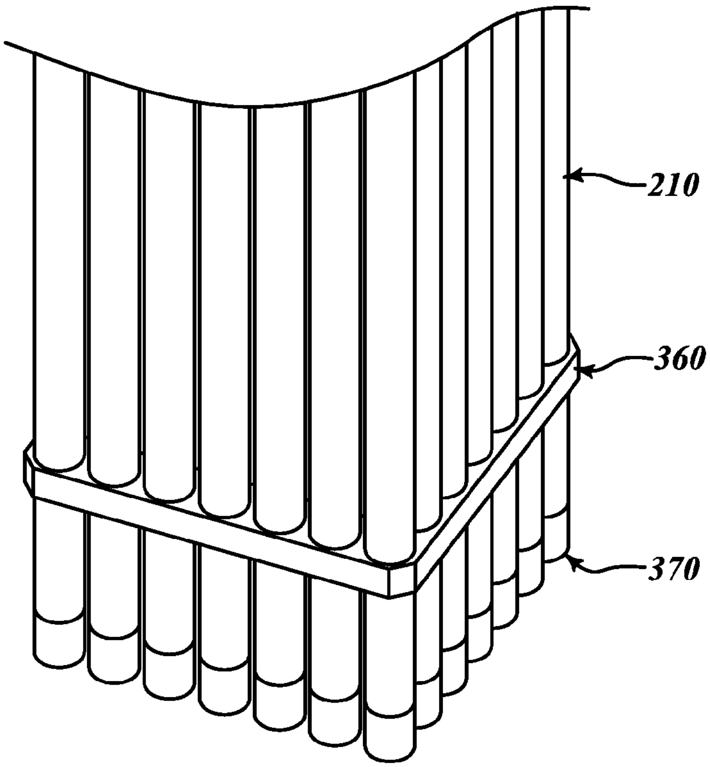

FIG. 18 is similar to FIG. 17 and shows the plate member separated from the pin cap members in accordance with the present teachings.

Figure 19:
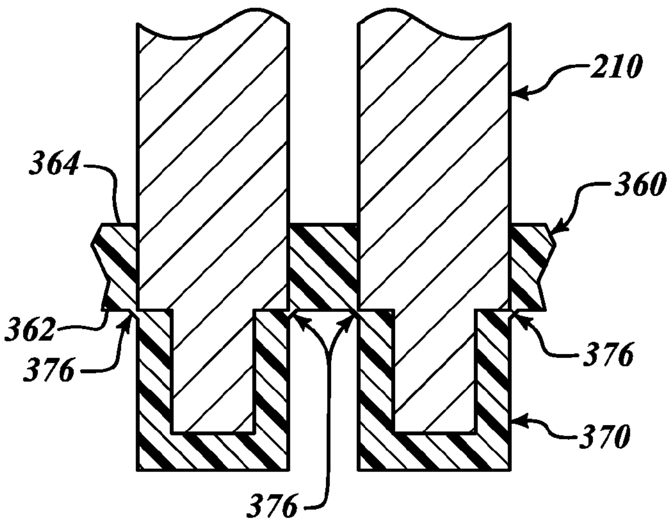

FIG. 19 is a partial cross-sectional side view of the plate member and pin cap members of FIG. 15 illustrating an integral connection the peripheral hinge member between the plate member and the plurality of pin cap members in accordance with the present teachings.

Figure 20:
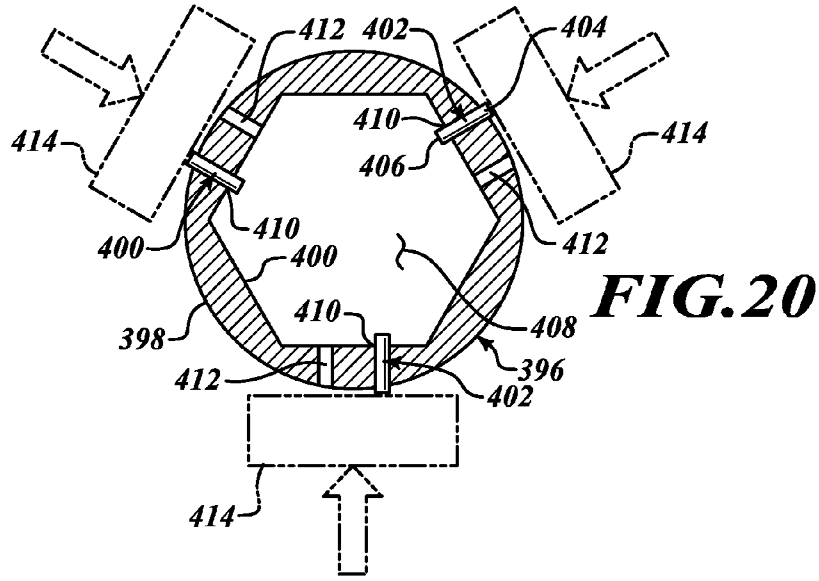

FIG. 20 is a cross-sectional view of a socket housing containing a first set of retaining pins in accordance with a further example of the present teachings.

Figure 21:
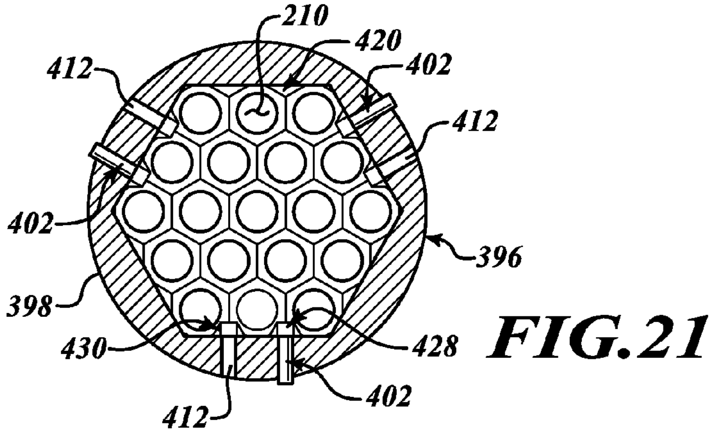

FIG. 21 is similar to FIG. 20 and shows the plate member placed over the first set of retaining pins in accordance with the present teachings.

Figure 22:
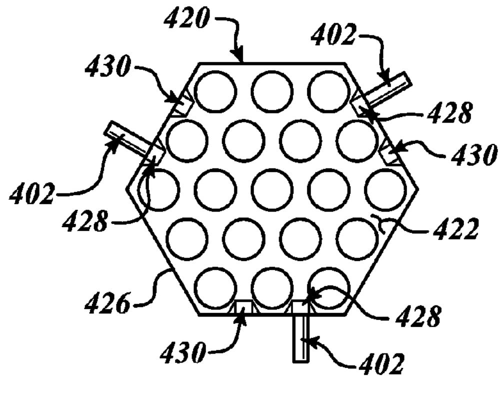

FIG. 22 shows the plate member of FIG. 21 illustrated without the socket housing to show the first channels formed on the plate member that receive each of the first retaining pins in accordance with the present teachings.

Figure 23:
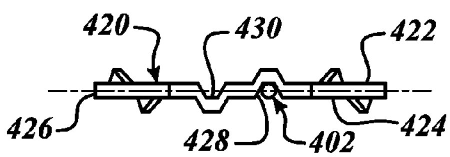

FIG. 23 is a side view of the plate member of FIG. 21 showing the channels that receive the first retaining pins in accordance with the present teachings.

Figure 24:
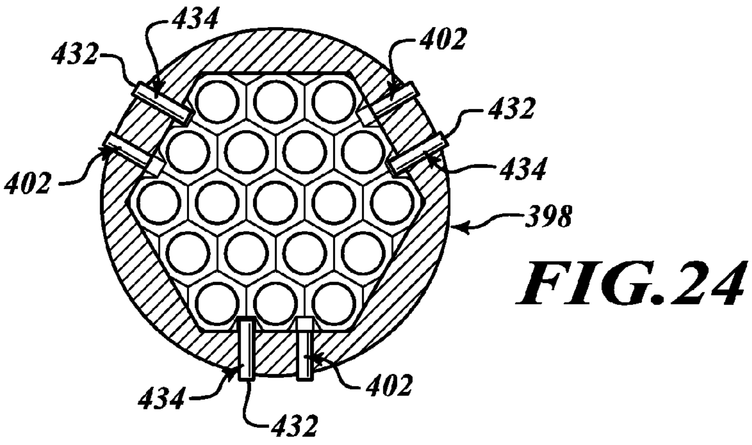

FIG. 24 is a cross-sectional view of the socket housing of FIG. 21 including a second set of retaining pins installed therein in accordance with the present teachings.

Figure 25:
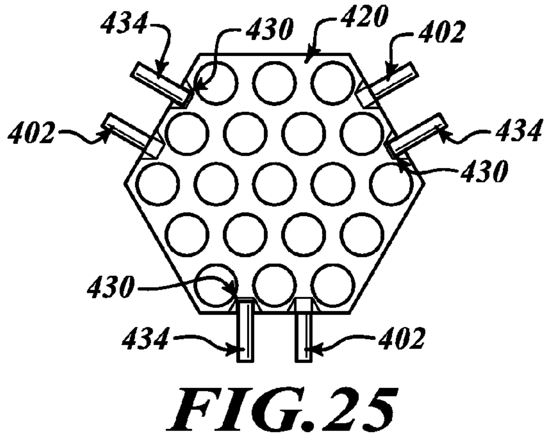

FIG. 25 shows the plate member of FIG. 24 illustrated without the socket housing to show the second channels formed on the plate member that receive each of the second retaining pins in accordance with the present teachings.

Figure 26:
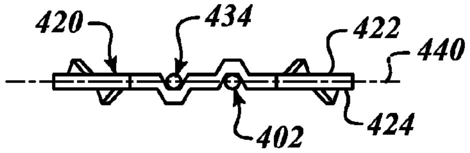

FIG. 26 is a cross-sectional view of the exemplary plate member of FIG. 22 showing the plate member including the second channels that receive the second set of retaining pins in accordance with the present teachings.

Figure 27:
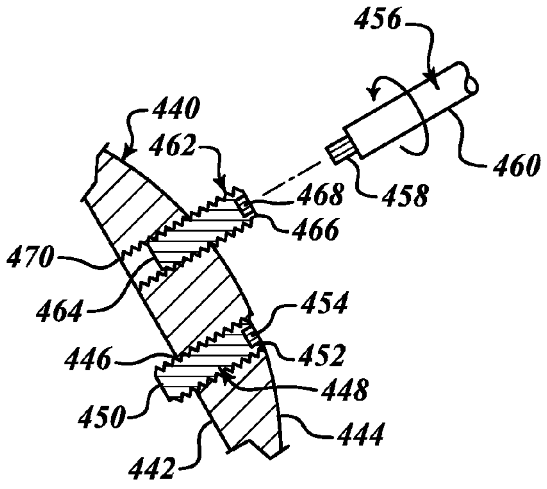

FIG. 27 is a cross-sectional view of a socket housing having a plurality of threaded apertures that receive a plurality of threaded retaining pins in accordance with a further example of the present teachings.

Figure 28:
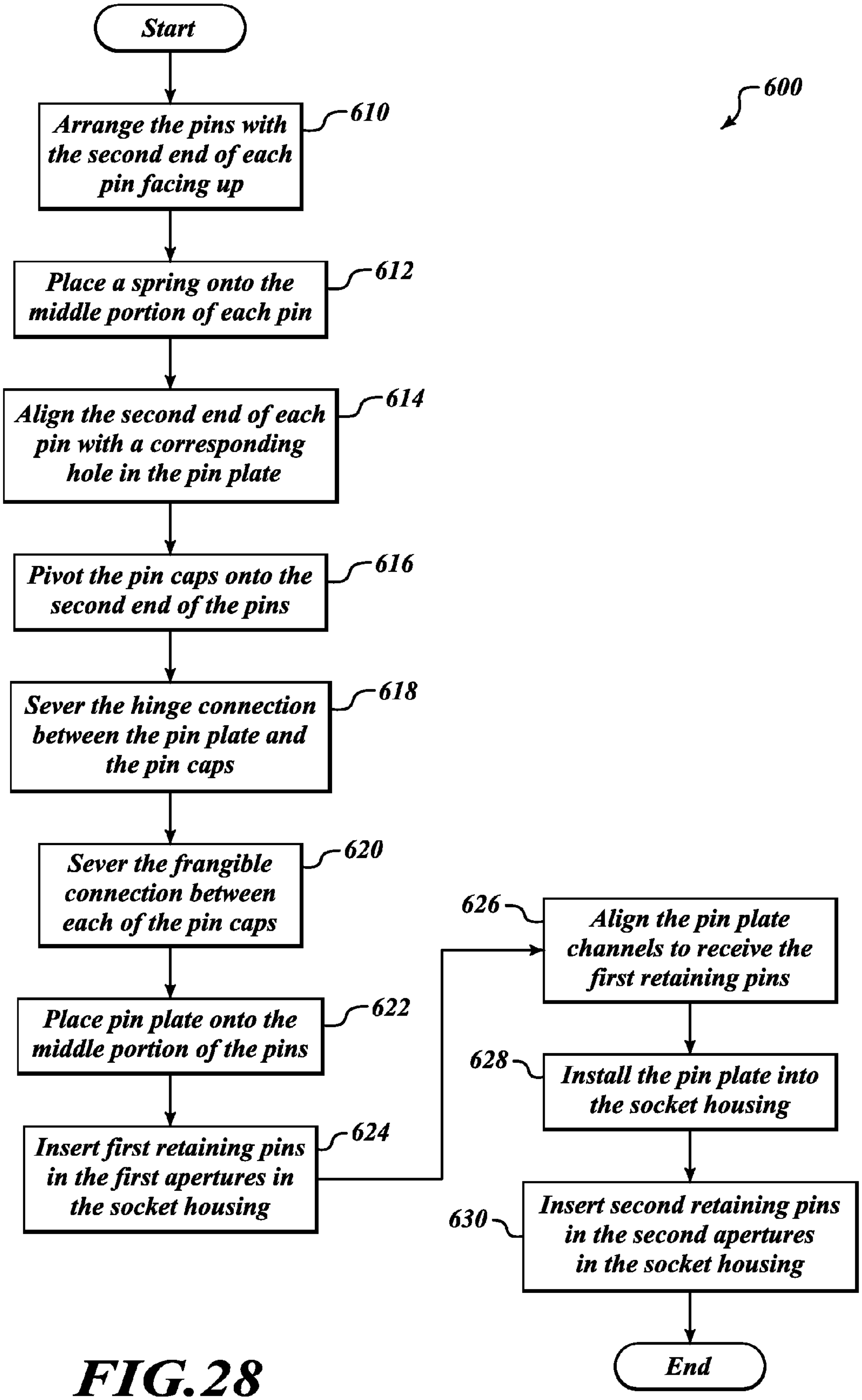

FIG. 28 is a flow diagram illustrating an exemplary method of assembly of the universal socket in accordance with the present teachings.

DETAILED DESCRIPTION

The following description is merely exemplary in nature and is not intended to limit the present teachings, their application, or uses. It should be understood that throughout the drawings, corresponding reference numerals indicate like or corresponding parts and features.

Moreover, certain terminology can be used for the purpose of reference only and do not limit the present teachings. For example, terms such as “upper,” “lower,” “above,” and “below” can refer to directions in the drawings to which reference is made. Terms such as “front,” “back,” “rear,” and “side” can describe the orientation of portions of the component within a consistent but arbitrary frame of reference which can be made more clear by reference to the text and the associated drawings describing the component under discussion. Such terminology can include the words specifically mentioned above, derivatives thereof, and words of similar import. Similarly, the terms “first,” “second,” and other such numerical terms referring to structures, systems, and/or methods do not imply a sequence or order unless clearly indicated by the context.

Figure 2:
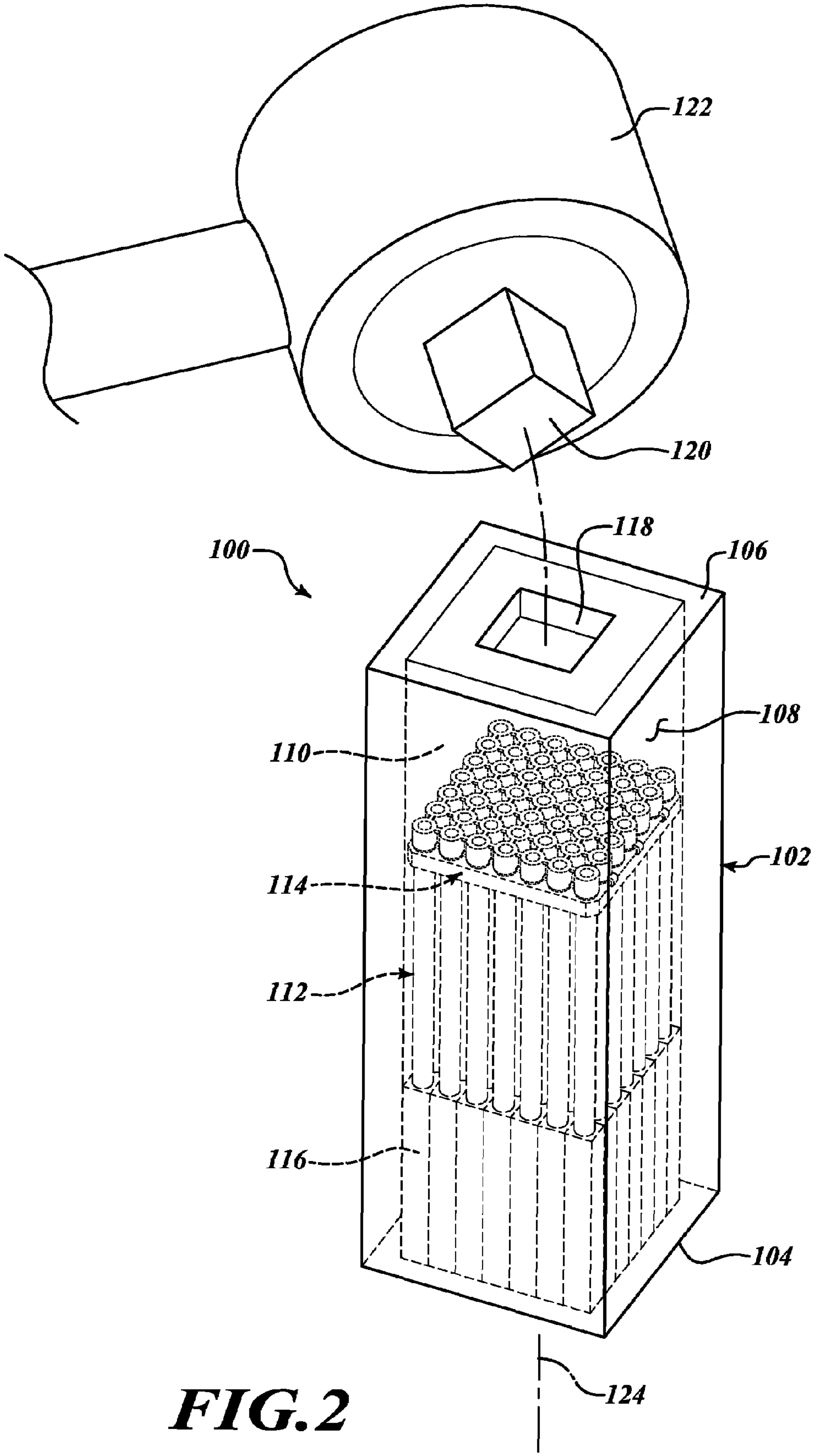
FIG. 2 is a partial perspective view of a rectangular-shaped universal socket having pin members that form to the fastener received by the universal socket in accordance with the present teachings.

With reference to FIG. 2, a universal socket 100 generally includes a socket housing 102 having a first end portion 104 and a second end portion 106. The universal socket 100 can have a rectangular outer periphery 108 and a rectangular inner periphery 110. The universal socket 100 can include a plurality of retractable pin members 112. When the universal socket 100 receives the fastener 18 or other such fasteners, the fastener 18 can press a number of the pin members 112 into the universal socket 100. The portion of the pin members 112 that are not pressed by the fastener 18 can engage the sides of the fastener 18 while the universal socket 100 is rotated. When the universal socket 100 is removed from the fastener 18, each of the pin members 112 can return to their original position, as shown in FIG. 3.

The pin members 112 can be retained in a plate member 114 that can be positioned in a chamber 116 in the socket housing 102. The chamber 116 can extend partially through the socket housing 102 beginning from the first end portion 104. The second end portion 106 of the socket housing 102 can include a ratchet mounting hole 118. The ratchet mounting hole 118 can receive a square drive member 120 from a ratchet tool 122 to drive the universal socket 100 as is known in the art. In various examples of the present teachings, the plate member 114 and the pin members 116 can be inserted into the first end portion 104 of the socket housing 102 along a longitudinal axis 124 to secure the plate member 114 in the socket housing 102.

Figure 1:
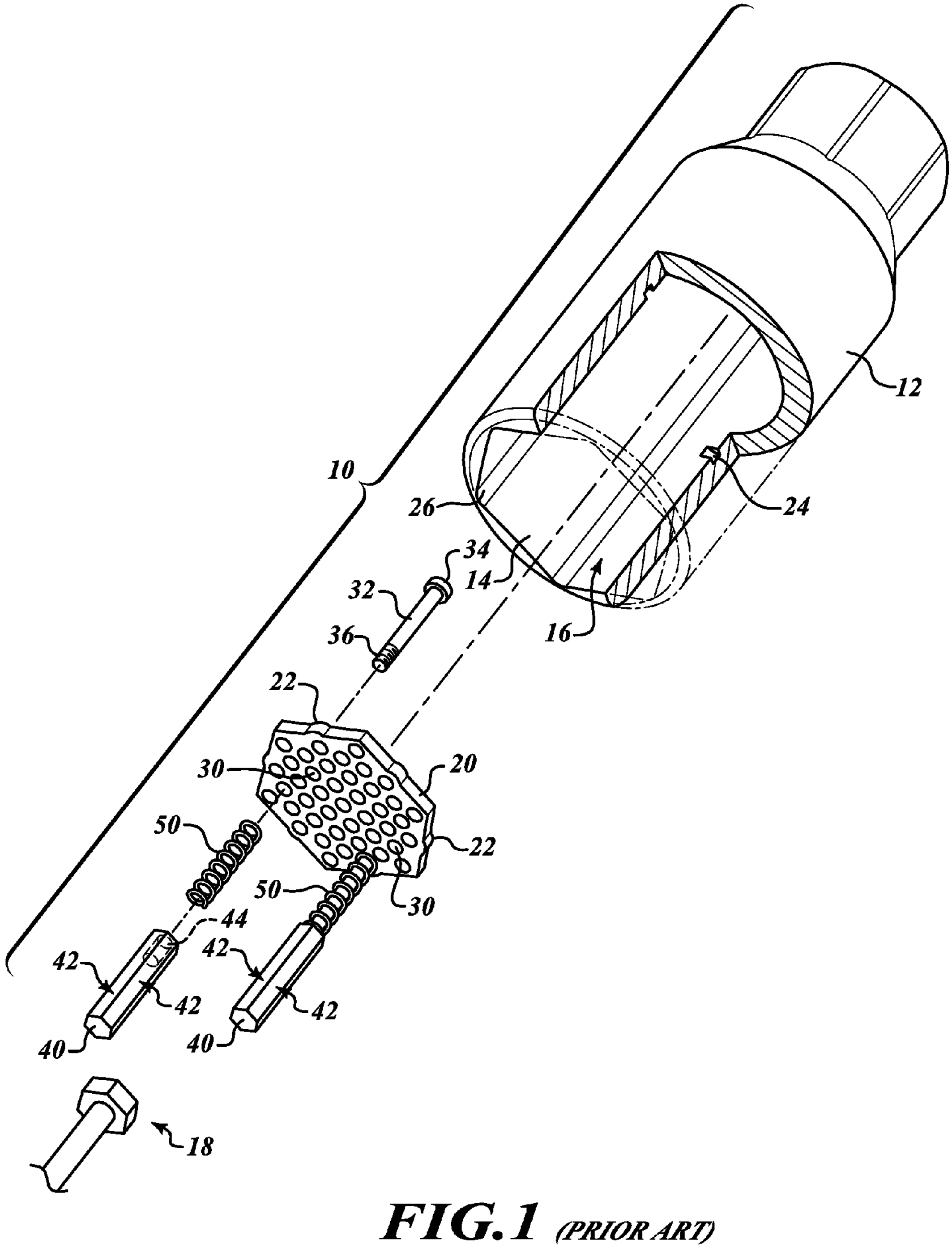
FIG. 1 (PRIOR ART)
FIG. 1 is an exploded assembly and a partial cutaway view of a prior art socket that forms to a fastener received by the socket.
Figure 3:
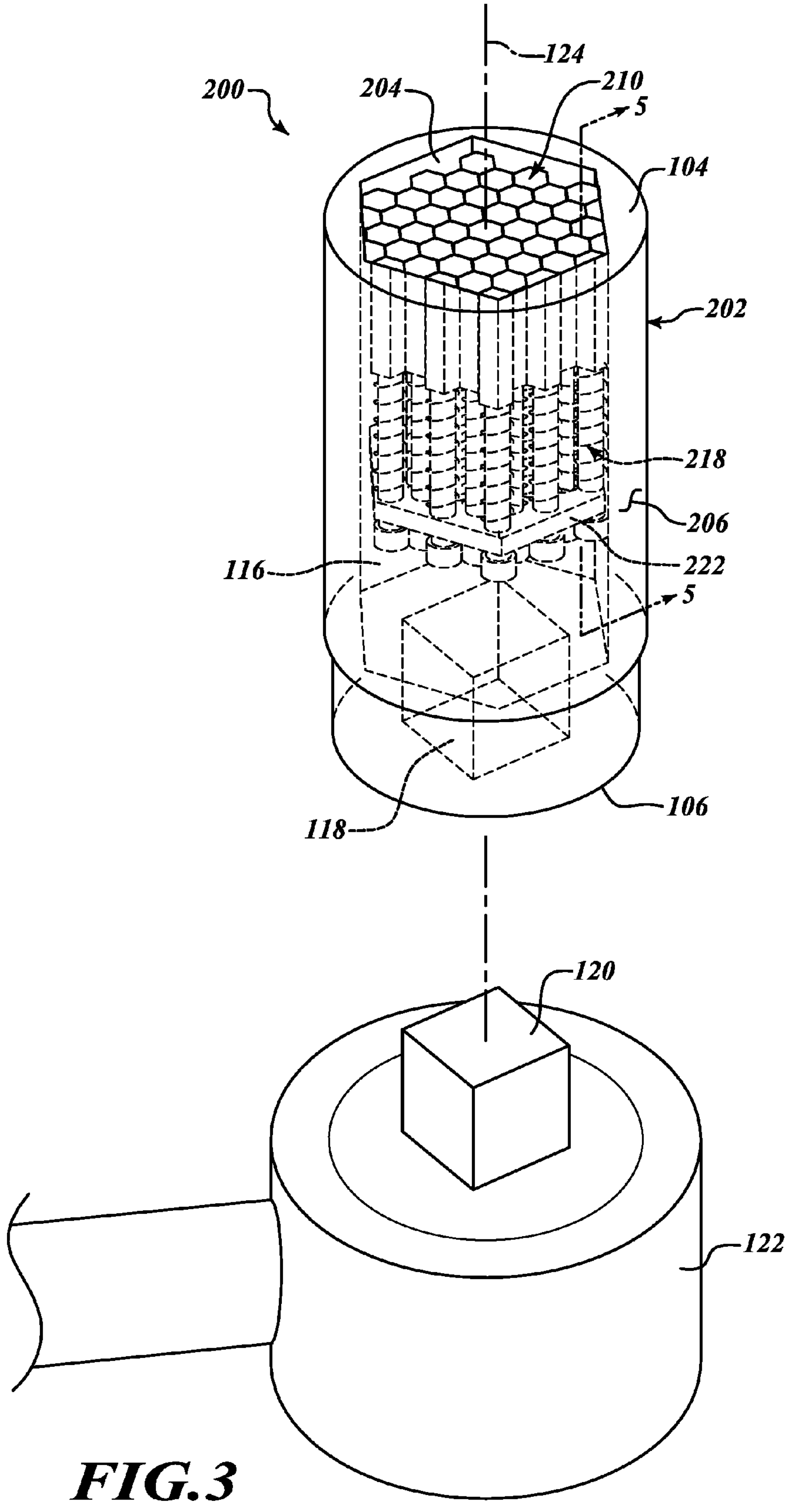
FIG. 3 is a partial perspective view of a hexagonal-shaped universal socket having pin members that form to the fastener received by the universal socket in accordance with a further example of the present teachings.

With reference to FIG. 3, a universal socket 200 is shown that is similar to the universal socket 100 in FIG. 2 and is provided in a generally hexagonal shape. The socket housing 202 includes a hexagonal inner periphery 204 and a circular outer periphery 206. The pin members 210 can be similar to the pin members 112 (FIG. 1) and the pin members 210 can have a first end portion that has a hexagonal shape that can correspond to and can cooperate with the adjacent pin members to be contained within a hexagonal inner periphery 204. Likewise, a plate member 222 can be similar to the plate member 114 (FIG. 2) and the plate member 114 can have a hexagonal shape. Each of the pin members 210 can include a spring member 218 that can be disposed over each of the pin members 210 to urge the pin members 210 toward the first end portion 104 of the socket housing 202.

Figure 4:
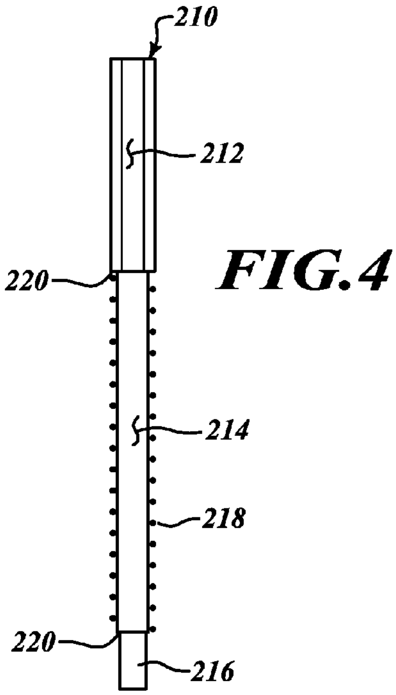
FIG. 4 is a side view of a pin member in the universal socket of FIG. 3 showing a spring member mounted on the pin member in accordance with the present teachings.
Figure 5:
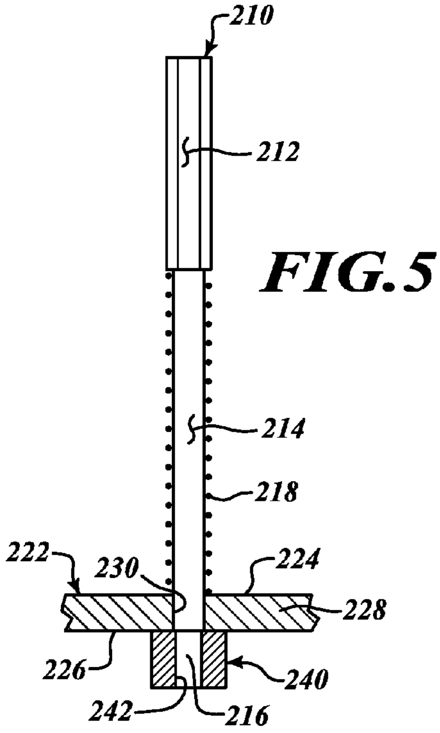
FIG. 5 is a partial cross-sectional side view of a plate member, a spring member, and a pin cap member mounted on the pin member of FIG. 4 shown in a first position in accordance with the present teachings.
Figure 6:
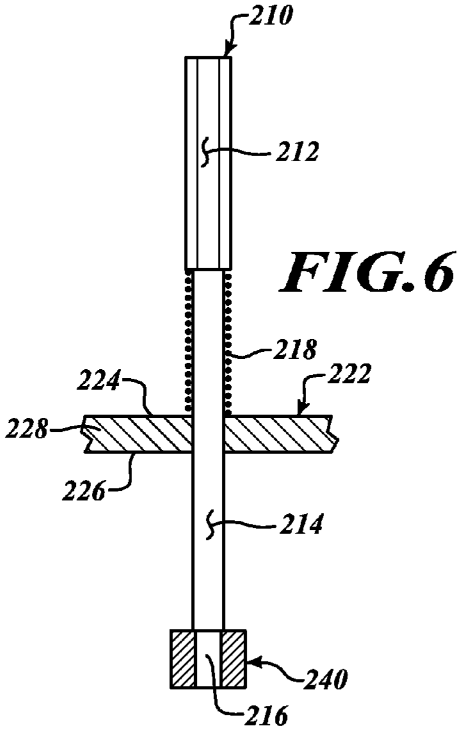
FIG. 6 is similar to FIG. 5 and shows the pin member, the spring member, the plate member, and the pin cap member in a second position in accordance with the present teachings.

With reference to FIGS. 4, 5, and 6, the cross-sectional diameter of a first end portion 212 of each of the pin members 210 can be greater than the cross-sectional diameter of a middle portion 214 of each of the pin members 210. The cross-sectional diameter of the middle portion 214 can be greater than the cross-sectional diameter of a second end portion 216 of each of the pin members 210. The spring member 218 can be disposed over the middle portion 214 of each of the pin members 210. A shoulder 220 can contain the spring member 218 on the middle portion 214 of each of the pin members 210. Each of the spring members 218 can be installed over each of the pin members 210 before the plate member 222 is installed on the pin members 210.

The middle portion 214 of each of the pin members 210 can receive and can be slidably supported by the plate member 222. The plate member can have a first and second surface 224, 226 and a peripheral edge 228. The plate member 222 can have through holes 230 formed between the first and second surfaces 224, 226. Each of the through holes 230 can accept the second portion 216 and the middle portion 214 of the respective pin members 210.

With reference to FIG. 4, one of the spring members 218 is shown on the middle portion 214 of one of the pin members 210. The inner cross-sectional diameter of each of the spring members 218 can be greater than the cross-sectional diameter of the second end portion 216 and the middle portion 214 of each of the pin members 210. In this regard, the spring member 218 can pass over the second end portion 216 of the pin members 210 and can be disposed on the middle portion 214 of the pin members 210. The outer cross-sectional diameter of the spring member 218 can be less than the cross-sectional diameter of the first end portion 212 of the pin members 210. The shoulder 220 can be formed between the first end portion 212 and the middle portion 214 of each of the pin members 210 and thus can contain the spring member 218 on the pin members 210. The spring member 218 can compress against the shoulder 220 when the first end portion 212 of each of the pin members 210 is depressed (FIG. 6) by the fastener 18 being inserted into the universal socket 100, 200.

With reference to FIG. 5, the pin members 210 and the spring members 218 can be connected to the plate member 222. Pin cap members 240 can be secured to the pin members 210 such that the second end portion 216 of the pin member 210 can be received in an aperture 242 formed in the pin cap members 240. The outer cross-sectional diameter of each of the spring members 218 can be greater than the cross-sectional diameter of each through hole 230 formed in the plate member 222. When the plate member 222 is installed on the pin members 210, each of the spring members 218 can be retained between the shoulder 220 of the pin members 210 and the first surface 224 of the plate member 210. When the fastener 18 is received by the universal socket 200, the first end portion 212 of each of the pin members 210 can be urged in a direction toward the plate member 222.

With reference to FIG. 6, the shoulder 220 of the pin members 210 can hold the spring member 218 in compression in a direction toward the plate member 222. The spring member 218 can remain compressed until the fastener 18 is removed from the universal socket 200. When the fastener 18 is removed from the universal socket 200, the spring member 218 can urge the first end portion 212 of the pin members 210 in a direction away from the plate member 222, i.e., in a direction toward an opening 244 of the chamber 116 (FIG. 3).

Figure 7:
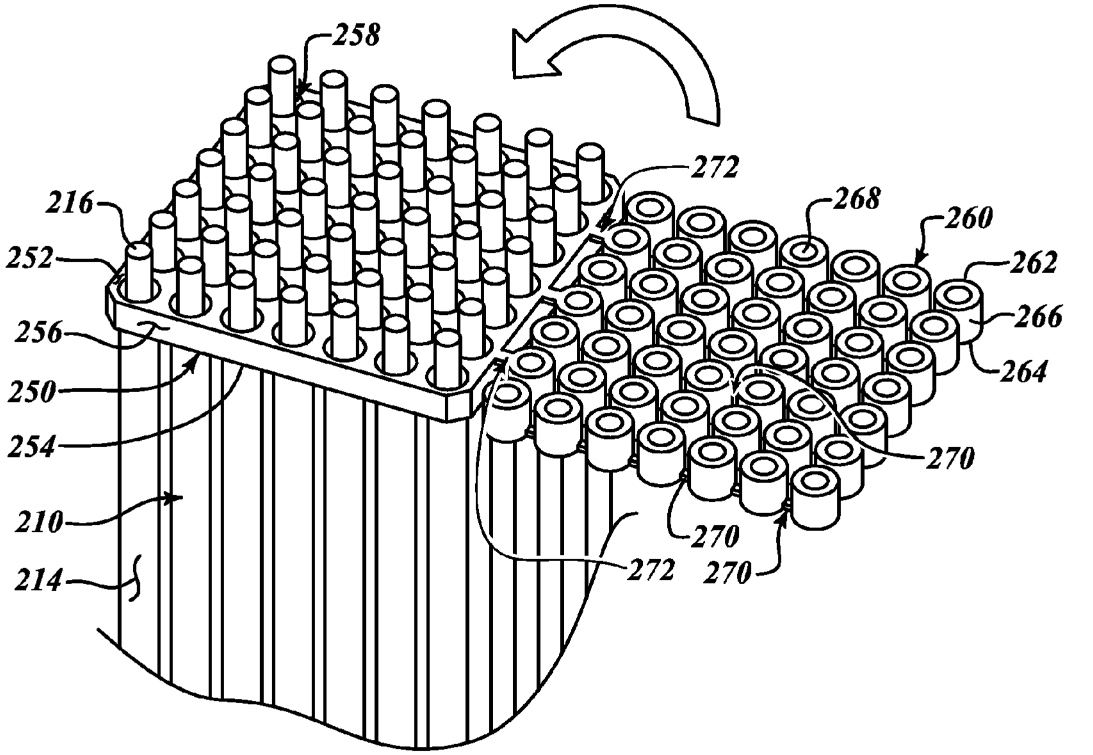
FIG. 7 is a partial perspective view of a plate member with a hinge member in an open position that pivotally connects a plurality of pin cap members to the plate member in accordance with the present teachings.

With reference to FIG. 7, a plate member 250 is shown in accordance with a further example of the present teachings. The plate member 250 can have a first surface 252, a second surface 254, a peripheral edge 256, and through holes 258 formed between the first and second surface 252, 254. The plate member 250 can be connected with the frangible connection to part of a plurality of pin cap members 260. Each of the pin cap members 260 can have a first end portion 262, a second end portion 264, and an outer periphery 266. The pin cap members 260 can each have an inner surface that defines an aperture 268 formed between the first and second end portions 262, 264. The second end portion 216 of each of the pin members 210 can be received in the aperture 268 formed in each of the pin cap members 260 with, for example, a press-fit. The cylindrical outer periphery 266 of the pin cap members 260 can have a cross-sectional diameter that can be greater than the cross-sectional diameter of each of the through holes 258 formed in a plate member 250 that can prevent the pin members 210 from passing through the through holes 258.

Figure 9:
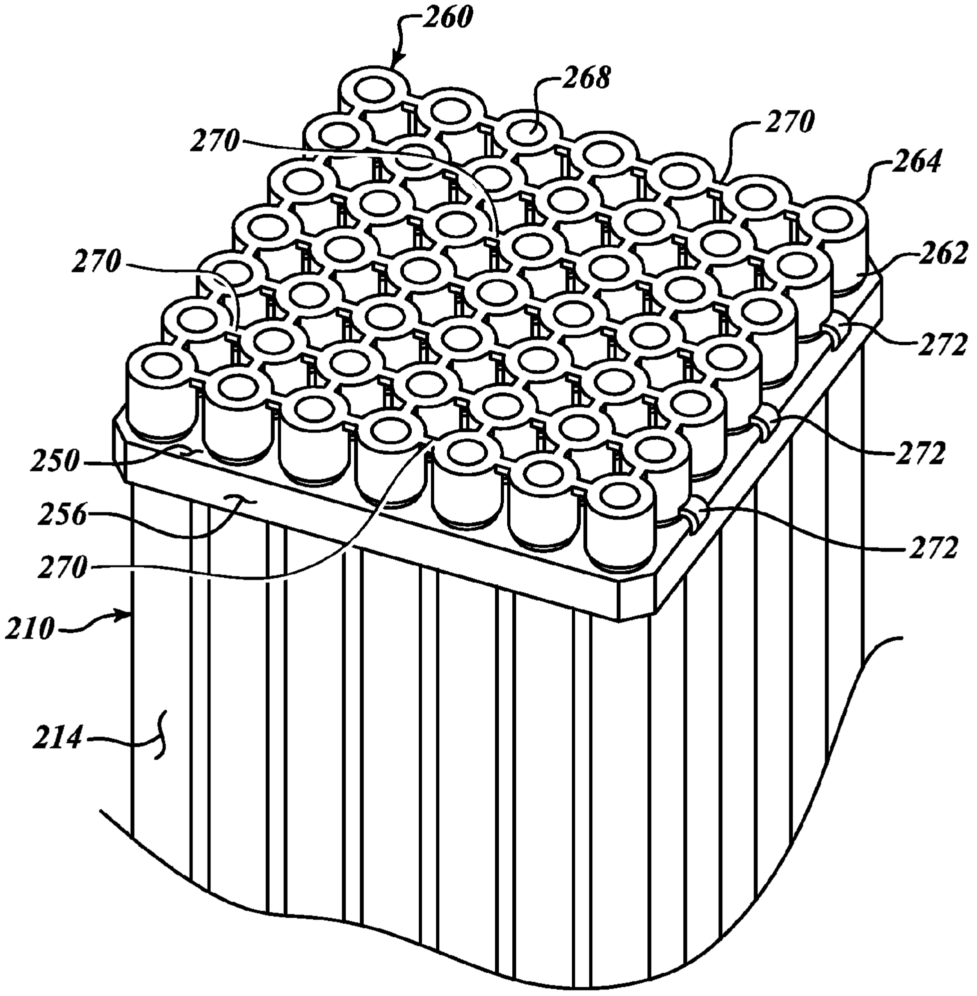
FIG. 9 is a partial perspective view of the plate member of FIG. 7 showing the hinge member in a closed position in accordance with the present teachings.

With reference to FIG. 9, the pin cap members 260 can each have a plurality of multiple frangible connections 270 formed between the outer surfaces 266 of each of the pin cap members 260. In one example, the frangible connections 270 can have a relatively thin cross-section in order to facilitate the relatively easy severing each of the frangible connections 270.

Figure 10:
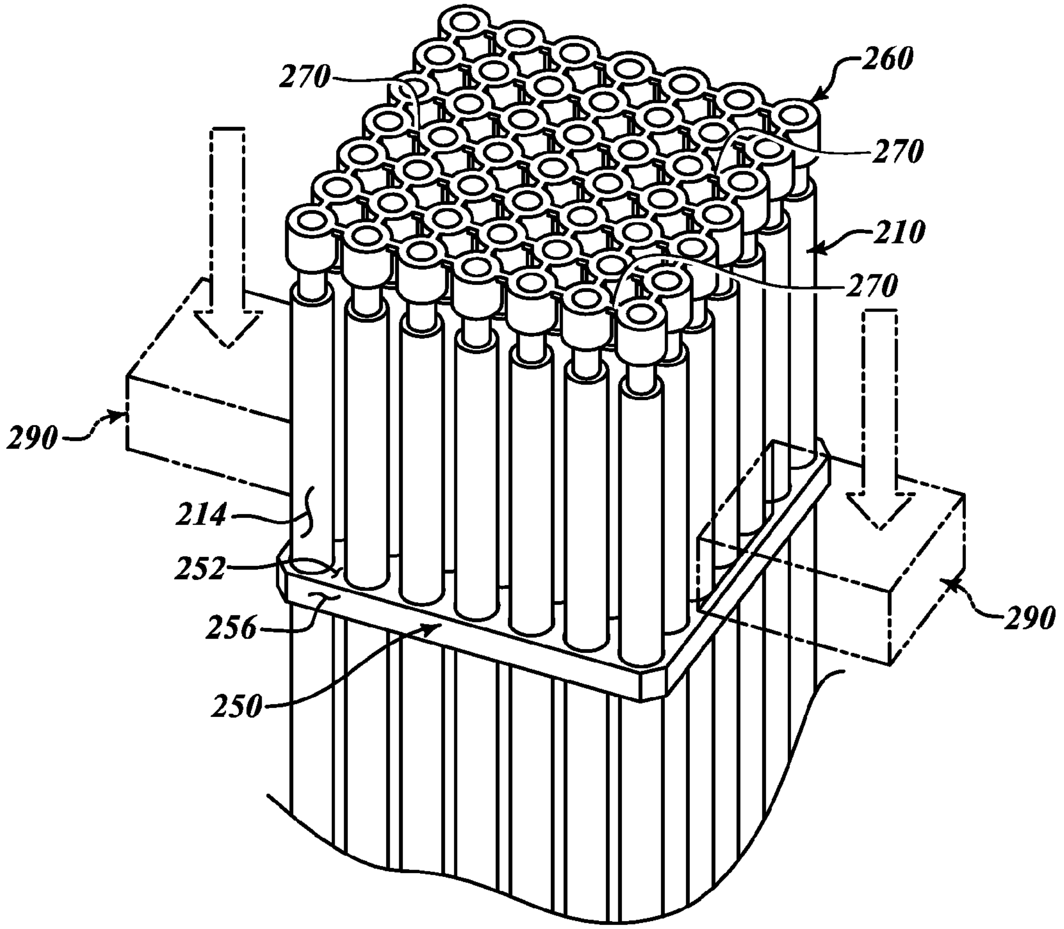
FIG. 10 is a partial perspective view of the plate member of FIG. 9 being severed from the pin cap members in accordance with the present teachings.
Figure 11:
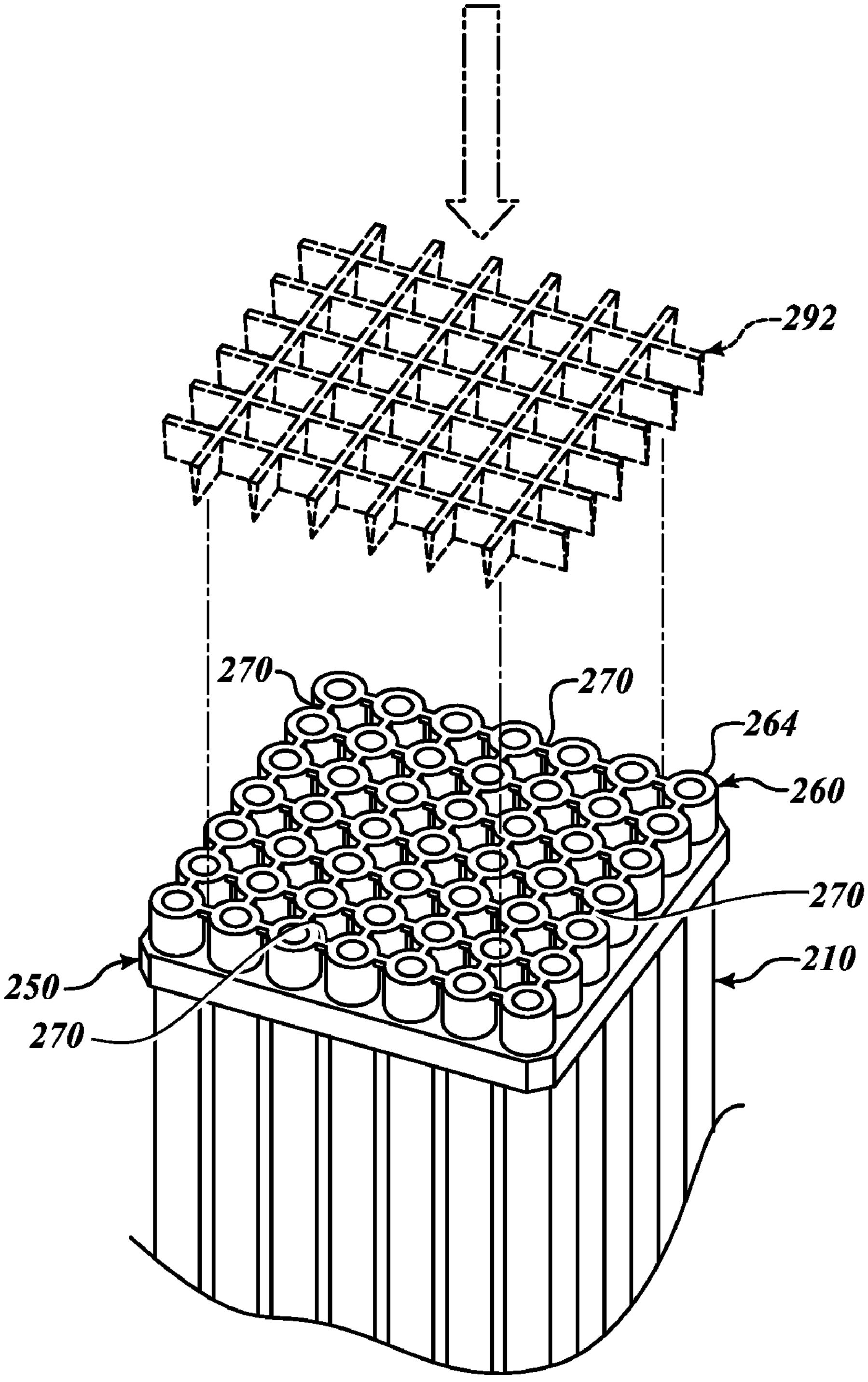
FIG. 11 is a partial perspective view of an exemplary tool that can sever frangible connections between the pin cap members in accordance with the present teachings.

In addition, the frangible connections 270 can be shown to allow the pin cap members 260 to be formed in a single molding operation. In this regard, the frangible connections 270 can be formed near or at the second end portion 264 of each of the pin cap members 260. When the pin cap members 260 are pivoted on the hinge members 272 toward the first surface 252 of the plate member 250, the frangible connections 270 can be subsequently exposed and then severed, an example of which is illustrated in FIG. 10 and FIG. 11. By severing the frangible connections 270, each of the pin members 210 can be permitted to move independently and therefore shape around the fastener 18.

The plate member 250 can be pivotally connected to each of the pin cap members 260 by the multiple hinge members 272. Each of the hinge members 272 can be formed between the peripheral edge 256 of the plate member 250 and the outer periphery 266 of part of the pin cap members 260. Forming each of the hinge members 272 near the first surface 252 of the plate member 250 and the first end portion 262 of each of the pin cap members 260 can be shown to allow each of the through holes 258 to be in a coaxial alignment with the apertures 268 when the first end portion 262 of each the pin cap members 260 are pivoted with each of the hinge members 272 toward the first surface 252 of the plate member 250. The coaxial alignment can be shown to allow each of the apertures 268 of the pin cap members 260 to receive one of the pin members 210 when the pin cap members 260 are pivoted with the hinge member 272 in a direction toward the pin members 210. When the pin cap members 262 are pivoted toward the pin members 210, each of the apertures 268 formed in the pin cap members 262 can receive the second end portion 216 of the corresponding pin members 210.

Figure 8:
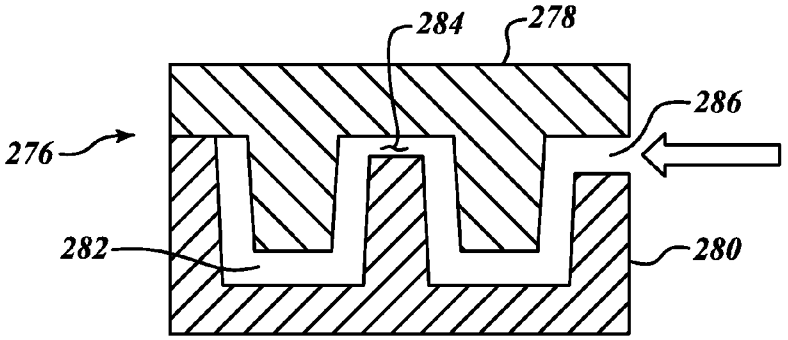
FIG. 8 is a partial cross-sectional view of an exemplary molding tool for forming the hinge member of FIG. 7 between the plate member and the pin cap members in accordance with the present teachings.

With reference to FIG. 8, an exemplary forming tool 276 is shown and can include a core portion 278 and a cavity portion 280 that can define a pin cap forming area 282 and the plate member forming area 286. The hinge member 272 can be formed in a channel 284 because a forming material can flow between the pin cap forming area 282 and the plate member forming area 286. Forming the plate member 250 and the pin cap members 260 in a single molding operation can be shown to reduce tooling costs and process complexity involved in manufacturing of the universal socket 100, 200. The plate member 114, 250, the hinge members 272, and the pin cap members 260 can be made of a lightweight and durable material that can be shown to reduce the weight of the universal socket 100, 200.

With reference to FIG. 10, the plate member 250 can be moved toward the middle portion 214 of each of the pin members 210 to a predetermined distance away from the pin cap members 260. An exemplary press tool 290 can be applied against the first surface 252 of the plate member 250. As the plate member 250 moves away from the pin cap members 260, each of the hinge members 272 can break apart, i.e., sever the frangible connection. The exemplary press tool 290 can be actuated using pneumatic, hydraulic or other suitable systems.

With reference to FIG. 11, an exemplary cutting tool 292 can sever each of the frangible connections 270 between each of the pin members 210. The cutting tool 292 can sever the frangible connections 270 in a single operation, and can do so by being urged in a direction toward the second end portion 264 of the pin cap members 260 using pneumatic, hydraulic, or other suitable systems. Each of the frangible connections 270 can also be melted using a laser or other suitable melting process. The frangible connections 270 can be severed individually, in groups, or all at once. Severing each of the frangible connections 270 can allow each of the pin members 210 to move independently, which, in turn, allows each of the pin members 210 to shape around the fastener 18.

Figure 12:
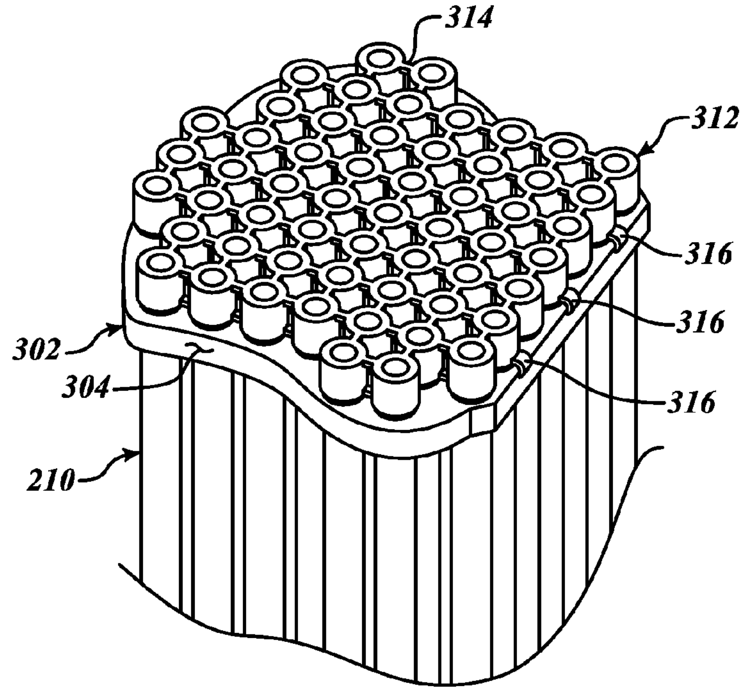
FIG. 12 is a partial perspective view of a plate member having a variable polygonal shape in accordance with another example of the present teachings.

With reference to FIG. 12, an exemplary plate member 302 is shown having a peripheral edge 304 that has a general shape that can be configured to any suitable polygonal shape including a square (FIG. 2), a hexagon (FIG. 3), and other suitable shapes to fit into the universal socket 100, 200. Pin cap members 312 can be arranged in a shape that generally corresponds to the shape of the plate member 302. Similar to the plate member 250 and the pin cap member 260 of FIG. 9, multiple frangible connections 314 can be formed between each of the pin cap members 312 and multiple hinge members 316 can be formed between the plate member 302 and the pin cap members 312. The hinge members 316 can permit the pin cap members 312 and the plate member 302 to be formed in a single molding operation.

Figure 13:
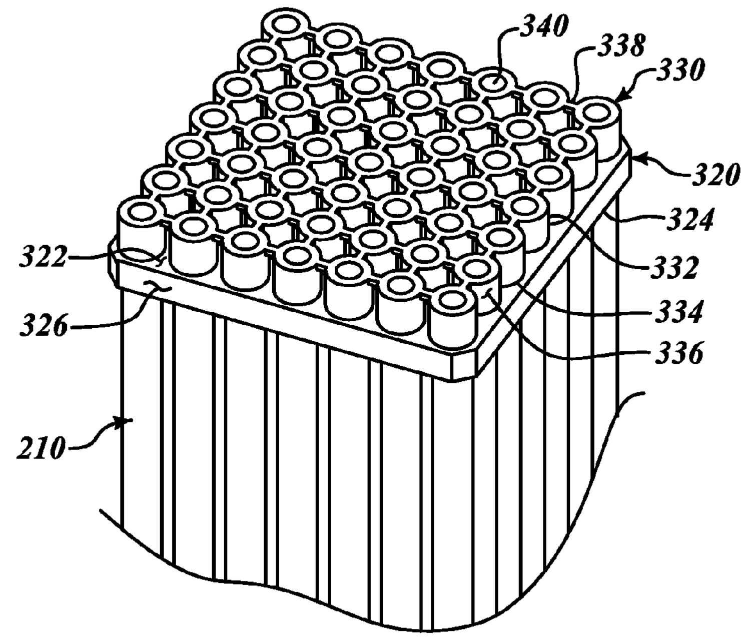
FIG. 13 is a partial perspective view of a plate member having frangible, interconnected pin cap members that have no connection to the plate member in accordance with another example of the present teachings.

With reference to FIG. 13, a plate member 320 and a plurality of pin cap members 330 can be formed separately from one another, which can eliminate a hinge member being formed between them. The plate member 320 can include a first surface 322, a second surface 324, and a peripheral edge 326. The pin cap members 330 can have a first end portion 332, a second end portion 334, and an outer surface 336. The pin cap members 330 can have multiple frangible connections 338 that can be formed between each of the pin cap members 330. The frangible connections 338 can be shown to allow the pin cap members 330 to, among other things, be molded in a single operation. Additionally, the frangible connections 338 can also provide alignment of the pin cap members 330 so that the pin cap members 330 can be placed on the pin members 210 in a single operation. Similar to what is illustrated in FIG. 9, the pin cap members 330 can have an aperture 340 formed within each of the pin cap members 330 that can receive the pin members 210. Each of the frangible connections 338 can be formed between and among the outer surface 336 of each of the pin cap members 330.

In one example, forming the plate member 320 and the pin cap members 330 separately can allow the plate member 320 and the pin cap members 330 to be formed of different materials. Using different materials to form the pin cap members 330 and the plate member 320 can permit a material with low friction characteristics to be used for the plate member 320 which can be shown to reduce the propensity of the plate member 320 to bind on a middle portion of the pin members 212. In contrast, a material with a higher friction characteristic can be used to form the pin cap members 330, which can be shown to reduce the propensity of the pin cap members 330 from disengaging from a second end portion 216 of each of the pin members 210. A material with a low creep characteristic can also be used to form the pin cap members 330. Using a material with a low creep characteristic to form the pin cap members 330 can be shown to prevent deformation of the pin cap members 330.

With reference to FIG. 14, another example of frangible connections 348 can interconnect multiple pin cap members 340. The frangible connections 348 can be rectangular shaped portions that can extend from a top surface 342 of each of the pin cap members 340 to another opposed top surface 342 of another 340. In contrast, the frangible connections 270 that are illustrated in FIG. 9 can be rectangular portions but can extend between the outer surface 266 (i.e., not top surface 342) of each of the pin cap members. Returning to FIG. 14, each of the pin cap members 340 can include, for example, six of the frangible connections 348. Near the outer surface 346 of the pin cap members 340, however, the number of frangible connections 348 can be reduced to facilitate installation of the pin members 210 into the socket housing 202.

With reference to FIG. 15 and FIG. 19, another example of a plate member 360 can include a first surface 362 and a second surface 364. The plate member 360 can have multiple pin cap members 370 molded on (i.e., integral to) the first surface 362 to form a single piece of contoured material. The plate member 360 can have a plurality of through holes 366 that can receive a middle portion 214 of each of the pin members 210, similar to the plate member 222 (FIG. 6).

In contrast to the frangible connections 270 illustrated in FIGS. 9-13 that can attach each of the pin cap members 260 together near the second end portion 264, multiple frangible connections 376 (shown in a cross-section in FIG. 19) can be formed between the second end portion 372 of each of the pin cap members 370 and a first surface 362 of the plate member 360. In this example, the frangible connections 376 can form a continuous, integral, contoured, but frangible connection between the pin cap members 370 and the plate member 360. Forming the plate member 360 and the multiple pin cap members 370, as illustrated in FIGS. 15-19, can be shown to allow a relatively smaller forming mold to be used and can be shown to eliminate the step of severing each of the frangible connections individually. In this example, each of the frangible connections 376 can include a relatively thin cross-section of material that can be continuously formed and contoured around a peripheral edge of each of the pin cap members 370 and a surface that defines each of the through holes 366 of the plate member 360. The thin cross-section of material can be shown to allow the relatively easy severing of the multiple frangible connections 376.

With reference to FIG. 16, the second end portion 216 of each of the pin members 210 can be aligned to accommodate a corresponding one of each of the through holes 366 in the plate member 360. The spring members 218, while not specifically shown in FIG. 16, can be placed between the plate member 360 and the pin cap 370. As such, the plate member 360 can be placed on the second end portion 216 of each of the pin members 210 in a single operation.

With reference to FIG. 17, the plate member 360 can be moved toward the middle portion 214 of the pin members 210 a predetermined distance until the frangible connections 376 between the plate member 360 and the pin cap members 370 can be severed. The plate member 360 can be moved toward the middle portion 214 of the pin members 210 and can be severed from the pin cap members 370 by using a press tool 380. The press tool 380 can be actuated using pneumatic, hydraulic or other suitable systems. With reference to FIG. 18, the plate member 360 can be mounted on the middle portion 214 of the pin members 210 and the pin cap members 370 can be mounted on the second end portion 216 of the pin members 210. The second end portion 216 of the pin members 210 can be placed into the universal socket 100, 200.

With reference to FIGS. 20-27, an exemplary method 600 of connecting a plate member 114, 222, 250, 320, 360 in a universal socket 100, 200 can include fitting first retaining pins 402 into a first set of apertures 410 in a socket housing 396, as shown in FIG. 20. The plate member 114, 222, 250, 320, 360 can then be installed in the socket housing 396, as shown in FIG. 21. Second retaining pins 434 can be fit into a second set of apertures 412 in the socket housing 396 to secure the plate member 114, 222, 250, 320, 360 in the universal socket 100, 200, as shown in FIG. 24.

With reference to FIG. 20, the socket housing 396 can have an outer periphery 398 and an inner periphery 400 that can receive first retaining pins 402. A force can be applied to a second end portion 404 of each of the first retaining pins 402 so that a first end portion 406 of each of the retaining pins 402 can be pushed into a chamber 408 of the socket housing 396 through the first aperture 410. The first and second apertures 410, 412 can be formed adjacent to each other so that the first and second apertures 410, 412 can be positioned at the same horizontal plane. A press tool 414 can be placed against the second end portion 404 of each of the first retaining pins 402 and can be driven toward the socket housing 396 until the first end portion 406 of each of the first retaining pins 402 protrudes into the chamber 408 by a predetermined distance in order to receive and initially hold the plate member 420 (FIG. 21). The press tool 414 can be driven by pneumatic, hydraulic or other suitable pressure.

With respect to FIGS. 21-23, the plate member 420 and the plurality of pin members 210 can be held in position by the first end portion 406 of the first retaining pins 402. The plate member 420 can include a first surface 422 and a second surface 424 opposite the first surface 422. Between the first surface 422 and the second surface 424, the plate member 420 can define a peripheral edge 426. A group of first channels 428 can be formed on the peripheral edge 426 and can bulge from the second surface 424 of the plate member 420. A group of second pockets 430 can be formed on the peripheral edge 426 and can bulge from the first surface 422. The first and second pockets 428, 430 can have similar shapes.

Each of the first pockets 428 can receive the first end portion 406 of the first retaining pins 402. The first pockets 428 can include tapered adjacent walls that can be shown to facilitate insertion by, for example, catching the first retaining pins 402 and moving the plate member 420 so the first retaining pins 402 can move into each of the first pockets 428. With reference to FIG. 21, the plate member 420 can be disposed in the socket housing 396 and sit on the first end portion 406 of each of the first set of retaining pins 402. The plate member 422 is illustrated in FIG. 22 without the socket housing 396 to better show the first channels 428.

With respect to FIGS. 24 and 25, a plurality of second retaining pins 434 can be inserted into each of the second pockets 430 by urging each of the plurality of second retaining pins 434 into each of the second apertures 412. When each of the second pockets 430 receives one of each of the second retaining pins 434, the plate member 420 can be secured in the socket housing 396 and is therefore unable to move in the longitudinal direction. With reference to FIG. 26, the plurality of first and second retaining pins 402, 434 can be arranged in pairs. The first and second retaining pins 402, 434 as pairs can be generally equally circumferentially spaced from other pairs.

With reference to FIG. 27, another example of a socket housing 440 can include an inner periphery 442, an outer periphery 444, and a first aperture 446 that can have a female thread formed therein. The socket housing 440 can include a plurality of first screws 448 that can have a male thread formed thereon. Each of the first screws 448 can be used in lieu of the first and second retaining pins 402, 434 to secure plate member 420. Each of the first apertures 446 can receive a first retaining screw 448 threaded therein.

Each of the first retaining screws 448 can have a first end portion 450 and a second end portion 452. The first end portion 450 of each of the first retaining screws 448 can be disposed beyond an inner periphery of the socket housing 440 similar to the retaining pins 402, 434 in order to retain the plate member 422 in the socket housing 440. The second end portion 452 can include a slot 454. The slot 454 can allow a driver 456 having a head 458 and body 460 to thread the first retaining screw 448 into the first aperture 446.

The socket housing 440 can include a plurality of second retaining pins 462 having a male thread formed thereon. Each of the retaining pins 462 can have a first end portion 464, and a second end portion 466. A slot 468 can be formed in the second end portion 466. Each of the second retaining pins 462 can be threaded into one of a plurality of second apertures 470 using the driver 456.

With respect to FIG. 28, a flow diagram illustrates the exemplary method 600 of assembly of the universal socket. In block 610, a predetermined number of the pin members 112, 210 can be arranged such that the second end portion 216 of the pin members 112, 210 can be facing in an upward direction. In block 612, the spring member 218 can be positioned onto each of the pin members 112, 210. In block 614, the pin members 112, 210 can be arranged so that pin members 112, 210 can be in alignment with through holes 258 in the plate member 114, 222, 250, 320, 360, 420.

In block 616, the pin cap members 240, 260 can be pivoted and forced onto the second end portion of each of the pin members 112, 210. In block 618, hinge members 272 that can serve as the frangible connection between the plate member 114, 222, 250 and the pin cap members 240, 260 can be severed. In block 620, the frangible connection between each of the pin cap members 240, 260 and the plate member 114, 222, 250 can be severed. In block 622, the plate member 114, 222, 250 can be placed onto the second end portion 216 of the pin members 112, 210 so that each of the through holes 258 can receive one of the pin members 112, 210 and the plate member 114, 222, 250 can be forced onto the middle portion 214 of each of the pin members 112, 210.

In block 624, each of the first retaining pins can be inserted into a corresponding first aperture that is formed in the socket housing such that a first end portion of each of the first set of retaining pins extends into the chamber of the universal socket 100, 200. In block 626, the first pockets in the plate member can be axially aligned to be positioned to receive the first retaining pins. In block 628, the plate member can be placed in the socket housing 100, 200. It will be appreciated in light of the disclosure that the plate member can be placed in the socket housing when the plate member is severed from the pin cap members. In block 630, the second retaining pins can be placed into corresponding second apertures that can be formed in the socket housing such that a first end portion of each of the second set of retaining pins can extend into the chamber of the socket and can be received by the second pockets in the plate member. The second retaining pins in cooperation with the first retaining pins can secure the plate member in the socket housing.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components, and/of functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples of following within the foregoing description and the appended claims.

What is claimed is:

1. A universal socket that forms around a fastener to drive the fastener received by the universal socket comprising:

a socket housing including a circumferential wall that defines a chamber having an inner periphery and an opening, said inner periphery extends through said socket housing along a longitudinal axis;

a plurality of pin members operable to be disposed in said chamber;

each of said pin members having a middle portion disposed between a first end portion and a second end portion, said first end portion operable to contact the fastener, said middle portion having a cross-sectional diameter that is greater than a cross-sectional diameter of said second end portion and less than a cross-sectional diameter of said first end portion;

a plate member having a first surface and a second surface defining through holes formed between said first and second surfaces, said through holes accommodate said cross-sectional diameter of said middle portion of said pin members but each of said through holes are too small to accommodate said cross-sectional diameter of said first end portion of said pin members, said plate member operable to connect in said chamber to hold said plurality of pin members in said socket housing;

a plurality of pin cap members, each of said pin cap members having a frangible connection with an adjacent pin cap member, said plate member having a frangible connection with at least a part of said plurality of pin cap members, each of said pin cap members having a first end portion and a second end portion, said first end portion of each of said pin cap members define an aperture that is operable to accept said second end portion of said pin members.

2. The universal socket of claim 1, wherein said plate member is operable to disconnect from said part of said plurality of pin cap members at said frangible connection when installed in said socket housing, said plate member is operable to individually support each of said pin members to slide through said plate member along said longitudinal axis when installed in said socket housing.

3. The universal socket of claim 1, wherein said frangible connection between said plate member and said plurality of pin cap member includes at least two hinge members that connect said part of said plurality of pin cap members to said plate member, said at least two hinge members permit said plurality of pin cap members to pivot relative to said plate member and permit said plate member to disconnect from said plurality of pin cap members when installed in said socket housing.

4. The universal socket of claim 1, wherein said frangible connections between said pin cap members and said plate member each define an integral connection between an outer periphery of each of said first end portions of said pin cap members and said plate member.

5. The universal socket of claim 1 further comprising: a plurality of spring members, each of said spring members are disposed over each of said pin members and said spring members are disposed between said plate member and said first end portions of said pin members, said spring members operable to urge said pin members toward said opening of said socket housing when said plate member is installed in said chamber of said socket housing.

6. The universal socket of claim 1 further comprising: a first retaining pin having a first end portion and a second end portion opposite said first end portion, said socket housing defines a first aperture that extends into said chamber in a direction that is generally perpendicular to said longitudinal axis, said first aperture in said socket housing is operable to receive said first retaining pin and permit said first end portion of said retaining pin to extend into said chamber and contact said plate member.

7. The universal socket of claim 6 further comprising a second retaining pin having a first end portion and a second end portion opposite said first end portion, said socket housing defines a second aperture that extends into said chamber in said direction that is generally perpendicular to said longitudinal axis, said second aperture in said socket housing is operable to receive said second retaining pin and permit said first end portion of said second retaining pin to extend into said chamber and cooperate with said first retaining pin to hold said plate member in said chamber of said socket housing.

8. The universal socket of claim 1, wherein said through holes in said plate member are sized to be operable to not permit said pin cap members to pass through said through holes.

9. A universal socket that forms around a fastener to drive the fastener received by the universal socket comprising:

a socket housing including a circumferential wall that defines a chamber having an inner periphery and an opening, said inner periphery extends through said socket housing along a longitudinal axis;

a plurality of pin members operable to be disposed in said chamber;

each of said pin members having a middle portion disposed between a first end portion and a second end portion, said first end portion operable to contact the fastener, said middle portion having a cross-sectional diameter that is greater than a cross-sectional diameter of said second end portion and less than a cross-sectional diameter of said first end portion;

a plate member having a first surface and a second surface defining through holes formed between said first and second surfaces, said through holes accommodate said cross-sectional diameter of said middle portion of said pin members but each of said through holes are too small to accommodate said cross-sectional diameter of said first end portion of said pin members, said plate member operable to connect with said chamber to hold said plurality of pin members in said socket housing:

a plurality of pin cap members, each of said pin cap members having a frangible connection with said plate member, each of said pin cap members having a first end portion and a second end portion, said first end portion of each of said pin cap members defines an inner periphery that is operable to accept said second end portion of said pin members, said first end portion of each of said pin cap members also defining an outer periphery that connects to said plate member to provide said frangible connection between each of said pin cap members and said plate member.

10. The universal socket of claim 9, wherein said plate member is operable to disconnect from said part of said plurality of pin cap members by severing said frangible connection when installed in said socket housing, said plate member is operable to individually slidably support each of said pin members to slide along said longitudinal axis when said plate member is installed in said chamber of said socket housing.

11. The universal socket of claim 9, further comprising: a plurality of spring members, each of said spring members disposed over each of said pin members and disposed between said plate member and said first end portion of said pin member, each of said spring members urges each of said pin members toward said opening of said socket housing.

12. The universal socket of claim 9 further comprising: a first retaining pin and a second retaining pin each having a first end portion and a second end portion opposite said first end portion, said socket housing defines a first aperture and a second aperture that extend into said chamber in a direction that is generally perpendicular to said longitudinal axis, said first aperture in said socket housing is operable to receive said first retaining pin and permit said first end portion of said retaining pin to extend into said chamber and contact said plate member, said second aperture in said socket housing is operable to receive said second retaining pin and permit said first end portion of said second retaining pin to extend into said chamber and cooperate with said first retaining pin to hold said plate member in said chamber of said socket housing.

13. The universal socket of claim 9, wherein said through holes in said plate member are sized to be operable to not permit said pin cap members to pass through said through holes.

14. A method of assembling a universal socket that forms around a fastener to drive the fastener received by the universal socket, the method comprising:

providing a plate member having a plurality of through holes;

providing a plurality of pin cap members, each of said pin cap members having a frangible connection with an adjacent pin cap member, each of said pin cap members having a first end that defines an aperture;

providing hinge members that pivotally connect said plate member to a part of said plurality of pin cap members, each of said hinge members defining additional frangible connections;

providing a plurality of pin members having a middle portion between a first end portion and a second end portion, said through holes accommodate a cross-sectional diameter of said first end portion of said pin members but each of said through holes are too small to accommodate a cross-sectional diameter of said first end portion of said pin members;

folding said pin cap members onto said plate member with said hinge members to align said apertures in each of said pin cap members with said through holes on said plate member;

inserting said pin members through said through holes in said plate member and into said apertures on said first ends of said pin cap members;

severing said frangible connection between each of said pin cap members and said hinge members that are frangible connections between said part of said pin cap members and said plate member.

15. The method of claim 14, further comprising:

providing a socket housing with a chamber having an inner periphery and an opening operable to retain said plate member and said pin members, said inner periphery extends through said socket housing along a longitudinal axis;

inserting a first retaining pin in a first aperture in said socket housing in a direction that is generally perpendicular to said longitudinal axis;

inserting said plate member into said socket housing to make contact with said first retaining pin;

inserting a second retaining pin in a second aperture in said socket housing in said direction that is generally perpendicular to said longitudinal axis to secure said plate member between said first and said second retaining pins.

16. The method of claim 14, wherein said severing said frangible connections between each of said pin cap members allows each of said pin cap members to move independently of one another.

* * * * *